United States Patent Office 3,143,465
Patented Aug. 4, 1964

3,143,465
PHARMACEUTICAL PREPARATIONS COMPRISING PHOSPHORUS CONTAINING CATION EXCHANGE RESINS HAVING A BASIC DRUG ADSORBED THEREON; AND TREATMENT THEREWITH
John Wm. Keating, Big Rapids, Mich., assignor to Wallace & Tiernan Inc., Belleville, N.J., a corporation of Delaware
No Drawing. Filed June 19, 1961, Ser. No. 117,853
29 Claims. (Cl. 167—65)

The invention relates to pharmaceutical preparations comprising phosphorus containing cation exchange resins having a basic drug adsorbed (ionically bound) thereon, and to their administration to patients.

In the co-pending application of John W. Keating Serial No. 726,010, filed April 2, 1958, there is disclosed and claimed pharmaceutical preparations for oral administration to a patient comprising in dosage unit form a therapeutically effective amount of cross linked sulphonic acid cation exchange resin having a gastro-intestinal absorbable pharmaceutical organic drug containing a basic nitrogen group ionically bound to the resin to form an adsorption compound; the cross linkage of the resin of the adsorption compound being between approximately one to twenty percent and the particle size of the adsorption compound being between approximately 10 mesh and 400 mesh, and the cross linkage and particle size being such that not more than approximately 50 percent of the bound amine is released in one hour by elution with .07 N HCl and .03 N NaCl and at least approximately 10 percent is released in three hours, the amount of bound drug in the dosage unit being between .2 to 2000 milligrams calculated as drug base and being in sufficient amount as to be safely effective for a period of at least eight hours and the said drug in base form having an oral LD-50 in rats of between approximately 50 to 3000 milligrams per kilogram.

In said co-pending application there is also disclosed but not claimed the use of phosphonic acid cation exchange resins in place of sulphonic acid cation exchange resins in the preparation of the drug adsorption compounds and the statement is made therein that it is contemplated that such phosphonic acid cation exchange resins will give substantially the same results. This statement was based on certain experimental work.

Experimental work on the phosphonic acid-drug adsorption compounds and other phosphorus containing cation exchange resin adsorbates, including the phosphonic, phosphonous, and phosphoric acid cation exchange resins having drugs adsorbed thereon was also carried out after the filing of the aforesaid Keating patent application, and it was found that all of a large number of phosphorus containing cation exchange resin-drug adsorbates gave a substantially lesser adsorption of drug per unit of drug into the blood stream than the drug in base or common salt form and substantially slower rate of release by gastric and intestinal juice and consequent lesser absorption than the same drug adsorbed on a carboxylic acid cation exchange resin. The rate of release by the gastric and intestinal juice, like the sulphonic acid cation exchange resin-drug adsorbate could be made faster or slower by varying the particle size, cross linkage and amount of absorbed drug on the resin. With certain basic drugs the rate of release of the drug from the phosphorus containing cation exchange resin is not sufficiently sustained as to give a composition as useful as obtained with the sulphonic acid cation exchange resin. In many cases, however, the resulting composition was as useful for eight hour sustained release as obtained with the sulphonic acid cation exchange resins described in Keating application Serial No. 726,010, filed April 2, 1958, including the polystyrene divinyl benzene sulphonic acid cation exchangers. In all instances the basic drug adsorbed on the phosphorus containing cation exchange resin gave an adsorbate which was odorless and tasteless. The compositions were thus all useful as sustained release, tasteless and odorless drug preparations, whether or not the amount of the dosage unit was sufficient to be safe and effective eight hours or longer.

The discoverey that the phosphorus containing ion exchange resins give sustained release and tasteless drug adsorbates was unexpected because of their great affinity for hydrogen ions. Their pK values lie in the range of 4 to 4.8. The operating pH range suggested by the sellers of such resins is from 5 to 14. Because of their great affinity for hydrogen ions it would be expected that drug resinates of the phosphate resins would rapidly and completely release the drug at the acid pH of the gastric juice. Without being bound as to why this is not so, and that there is a sustained release, it is our belief that the sustained release characteristic and lack of taste is at least partially due to the sequestering or hydrogen bonding capability of the phosphoric, phosphonous or phosphonic functional group.

An object of this invention is to provide a resin-drug adsorbate or drug resinate of a type different from the sulphonic acid resin-drug adsorbate hitherto used, and which will give a slow and even release of the active drug when coming into contact with the normal contents of the gastrointestinal tract.

Another object is to provide a drug resinate with normally odoriferous or bad tasting drugs, the resulting drug resinate being non-odoriferous and tasteless but also having the characteristic of releasing the drug slowly and evenly in the gastrointestinal tract.

Another object is to provide a drug resinate preparation which is stable in tablet or capsule form as sold, but which releases the drug slowly at an effective therapeutic level throughout the period of time that it is in the stomach and for a substantial period of time that it is in the intestinal tract.

These and other advantages are attained by reacting any basic organic drug compound such as an amine or other compound containing a basic nitrogen group with a phosphonic, phosphonous, or phosphoric cation exchange resin to obtain an adsorption compound sometimes called a resin-drug adsorbate, resin complex, or drug resinate.

This drug resinate may, if desired, be mixed with pharmaceutically acceptable carriers, liquid or solids. It may be administered to the patient as a suspension, tablet or capsule. The amount of drug administered may be greater than that normally administered for the drug base, or drug in common salt form, and may be given in two or three times such amount so that one per day doses can be given. However, it also has the advantage of tastelessness and greater uniformity of action even when administered in an amount of drug normally administered when the base drug or common salt is administered. The amount of drug absorbed on the resin can vary widely. At below 1% drug the dosage amount is generally impractically high. Amounts of above 50% drug on the resinate ordinarily cannot be obtained as ionically bound drug; that is saturation is generally below 50% by weight of the resinate.

Cross linked resins of the polystyrene type of above 1% cross-linkage with divinyl benzene are preferred since these appear to give slower release of drug by gastric and intestinal juices.

In accordance with a preferred embodiment of the invention wherein a preparation is made of drug resinates which can be administered orally to the human patient only once per day, and safe effectiveness can be obtained for at least eight hours, the pharmaceutical preparation comprises in dosage unit form a therapeutically effective amount of cross linked phosphonic, phosphonous or phosphoric acid cation exchange resin having a gastro-intestinal absorbable pharmaceutical organic drug containing a basic nitrogen group ionically bound to the resin to form an adsorption compound; the cross linkage of the resin of the adsorption compound being between approximately one to twenty percent and the particle size of the adsorption compound being between approximately 10 mesh and 400 mesh, and the cross linkage and particle size being such that not more than approximately 50 percent of the bound amine is released in one hour by elution with .07 N HCl and .03 N NaCl and at least approximately 10 percent is released in three hours, the amount of bound drug in the dosage unit being between .2 to 2000 milligrams calculated as drug base and being in sufficient amount as to be safely effective for a period of at least eight hours and the said drug in base form having an oral LD-50 in rats of between approximately 10 to 3000 milligrams per kilogram.

Phosphorus containing cation exchange resins which are commercially available can be utilized to produce the products of this invention. Some of these resins are identified as:

(1) Duolite C-62 (also ES-62) described as a phosphonous acid resin composed of polystyrene cross-linked with 6 percent divinyl benzene, in bead form with a mesh size of 16 to 50. The functional group is —P(O)(OH) the capacity is 6.0 milli-equivalents per gram.

(Formula C-62)

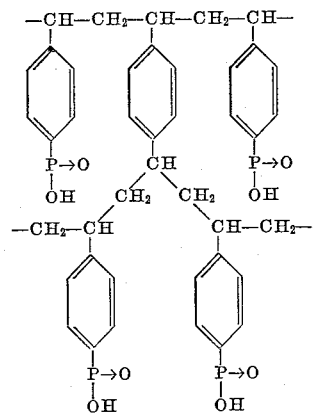

Suitable resins of this type are disclosed in Abrams Patent 2,844,546, specifically in Example I of that patent; also in Bregman Patent 2,911,378.

(2) Duolite C-63 (also ES-63) described as a phosphonic acid resin composed of a polystyrene matrix cross-linked with 6 percent divinyl benzene, in bead form with a mesh size of 16 to 50. The functional group is

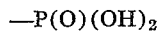
—P(O)(OH)$_2$

Capacity is 6.6 milli-equivalents per gram.

(Formula C-63)

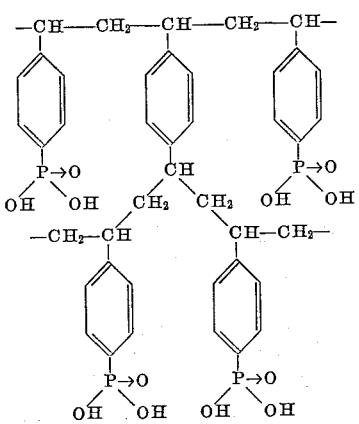

Suitable resins of this type are disclosed in Abrams Patent 2,844,546, specifically Examples II and III of that patent; also Bregman Patent 2,911,378.

The preferred resins for use in this invention are the cross-linked resins described generally as water insoluble phosphonated polymerizate of a mixture comprising a polyvinylaryl hydrocarbon compound (such as divinyl benzene) and a monovinylaryl compound (such as styrene).

(3) Duolite C-65 (also ES-65) described as a phosphoric acid resin with a phenolic matrix. Supplied in granular form. The functional group is

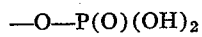
—O—P(O)(OH)$_2$

Capacity is 3.3 milliequivalents per gram.

(Formula C-65)

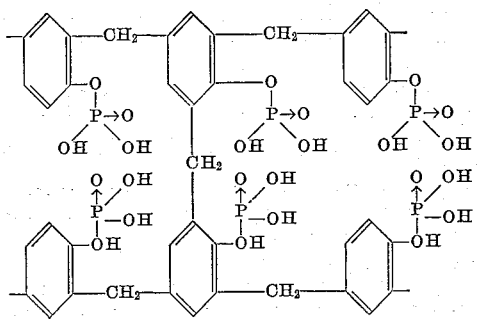

Suitable resins of this type are disclosed in Abrams Patent 2,844,546. The ES grades of the phosphorus containing resins are less porous modifications of the C grades. All of the resins may, if desired, be milled before or after reacting with the drug to reduce the particles of drug resin complex to any desired mesh size.

The following are examples of drug resinates coming under this invention:

EXAMPLE 1

*Phenyl-Tertiary Butylamine C-62*

327.4 grams hydrated Duolite C-62 H$^+$ equivalent to 275.0 grams anhydrous resin were slurried with 1.0 liter deionized water. 70.0 grams phenyl-tertiary-butylamine base were added and stirring was continued for four hours.

The resin complex was washed by decantation with two equal volumes of deionized water, filtered and oven dried at 55° C. over a weekend to 1.1% moisture.

Yield—299.0 grams.
Assay—1.5% N, 16.7% drug.
Resin complex odorless and tasteless.

| Elutions | Hour | Percent eluted | |
|---|---|---|---|
| Gastric juice | 1 | 62.5 | 63.0 |
|  | 2 | 14.5 | 13.4 |
|  | 3 | 8.0 | 6.6 |
| Intestinal juice | 4 | 4.7 | 5.0 |
|  | 5 | 5.0 | 5.9 |
|  | 6 | 3.6 | 4.5 |
| Six hour total |  | 98.4 | 98.4 |

LD-50 data:

|  | Mg./kg |
|---|---|
| This resin complex | 410 |
| IR-120 resin complex (21.23% drug) | 395 |
| Phenyl-tertiary-butylamine hydrochloride | 151 |

This resinate (resin complex) is a capsule in 10 mg. dosage unit amount of phenyl-tertiary-butylamine is suitable as an appetite suppressant on oral administration to a human. It could be given once per day and is effective and safe over a period of eight hours.

EXAMPLE 2

*Dihydrocodeinone C–62*

50.0 grams of hydrated Duolite C–62 resin $Na^+$ equivalent to 42.5 grams anhydrous resin were placed in a column.

21.2 grams of dihydrocodeinone bitartrate were suspended in 600 ml. deionized water, stirring, and run through the column at the rate of 3 ml./min.

The resin complex was washed with deionized water and dried for 16 hours at 55° C. to 2.4% moisture.

Yield—42.5 grams.
Assay—1.2% N, 26.6% drug.
Resin complex odorless and tasteless.

| Elutions | Hour | Percent eluted | |
|---|---|---|---|
| Gastric juice | 1 | 37.6 | 32.2 |
|  | 2 | 7.4 | 10.9 |
|  | 3 | 5.7 | 6.3 |
| Intestinal juice | 4 | 4.0 | 3.0 |
|  | 5 | 4.6 | 4.2 |
|  | 6 | 3.7 | 3.2 |
| Six hour total |  | 63.0 | 58.8 |

Acute toxicity—limited by amount of resin complex that can be orally given to a rat.
Showed resin complex less toxic than bitartrate salts.
LD-50 dihydrocodeinone bitartrate 250 mg./kg. (oral rat).
Acute toxicity resinate:

| Mg./kg. (as base) | 24 hrs. | 48 hrs. |
|---|---|---|
| 794 | 5/10 | 5/10 |
| 1,000 | 6/10 | 6/10 |
| 1,260 | 7/10 | 7/10 |

This resinate (resin complex) in a capsule dosage unit of 20 mg. of dihydrocodeinone is suitable for oral administration and is useful as an antitussive. It is safe and effective over a period of eight to twelve hours.

Similar results were obtained with codeine, morphine, pholcodine, and like morphine type compounds.

EXAMPLE 3

*Ephedrine Base C–62*

76.5 grams hydrated Duolite C–62 $H^+$ equivalent to 62.3 grams anhydrous resin were added to 15.4 grams ephedrine base dissolved in one liter deionized water. Stirring was continued for three hours.

The resin complex was washed twice by decantation, filtered by suction and dried at 55° C. to 1.2% moisture.

Yield—74.1 grams.
Assay—0.64% N, 7.55% drug.
Resin complex odorless and tasteless.

| Elutions | Hour | Percent eluted | |
|---|---|---|---|
| Gastric juice | 1 | 30.9 | 30.9 |
|  | 2 | 5.1 | 7.8 |
|  | 3 | 4.2 | 3.4 |
| Intestinal juice | 4 | 2.4 | 3.0 |
|  | 5 | 6.1 | 6.6 |
|  | 6 | 6.1 | 5.9 |
| Six hour total |  | 54.8 | 57.6 |

This resinate (resin complex) in a unit dosage amount of 15 mg. of ephedrine is safe and effective in treatment of asthma over a period of eight to twelve hours. It can be administered in tablet, capsule and suspension forms.

EXAMPLE 4

*Ephedrine C–62*

102.5 grams of hydrated Duolite C–62 $H^+$ equivalent to 75.1 grams anhydrous resin, were suspended in sufficient deionized water to cover the resin mass. 30.5 grams ephedrine HCl were dissolved in 750 ml. deionized water. The drug solution was added to the resin slurry while stirring. Stirring was continued for three hours.

The resin complex was washed with 3 volumes deionized water, filtered through a Büchner funnel and dried for 16 hours at 60° C. to 10.8% moisture.

Yield—89.0 grams.
Assay—0.5% N, 6.4% drug.
Resin complex odorless and tasteless.

| Elutions | Hour | Percent eluted | |
|---|---|---|---|
| Gastric juice | 1 | 6.8 | 6.9 |
|  | 2 | 3.6 | 3.8 |
|  | 3 | 3.0 | 2.8 |
| Intestinal juice | 4 | 4.9 | 4.4 |
|  | 5 | 8.5 | 8.0 |
|  | 6 | 6.5 | 5.0 |
| Six hour total |  | 33.3 | 30.9 |

This resinate (resin complex) in a unit dosage amount of 25 mg. of ephedrine is safe and effective in treatment of asthma over a period of eight to twelve hours. It can be administered in tablet and capsule forms.

EXAMPLE 5

*Dihydrocodeinone C–63*

75.6 grams hydrated resin Duolite C–63 $Na^+$ equivalent to 42.5 grams anhydrous resin was moistened with 100 ml. deionized water. The resin was placed in a 1.5 cm. diameter column. 52.3 grams of dihydrocodeinone bitartrate, equivalent to 31.0 grams of dihydrocodeinone base were dissolved in 1220 ml. deionized water. The drug solution was added to the resin by passing it through the resin column.

The resin complex was washed with 100 ml. deionized water and filtered through a Büchner funnel and dried for 16 hours at 55° C. to a 2.5% moisture.

Yield—40.2 grams.
Assay—2.0% N, 38.1% drug.
Resin complex odorless and tasteless.

| Elutions | Hour | Percent eluted | |
|---|---|---|---|
| Gastric juice | 1 | 32.5 | 32.3 |
|  | 2 | 8.7 | 9.4 |
|  | 3 | 5.3 | 5.6 |
| Intestinal juice | 4 | 5.4 | 7.5 |
|  | 5 | 8.2 | 6.9 |
|  | 6 | 5.7 | 4.9 |
| Six hour total |  | 65.8 | 66.6 |

This resinate (resin complex) in a capsule dosage unit of 20 mg. of dihydrocodeinone is suitable for oral administration and is useful as an antitussive. It is safe and effective over a period of eight to twelve hours.

EXAMPLE 6

Amphenidone C-63

41.6 grams hydrated Duolite C-63 H+ equivalent to 30 grams anhydrous resin were suspended in enough deionized water to cover the resin mass. 20 grams of amphenidone were dissolved in 300 ml. deionized water. 8 ml. concentrated HCl were added to the drug suspension to complete the solution of the drug. The drug solution was added to the resin slurry while stirring. Stirring was continued for five hours.

The resin complex was washed three times by decantation, filtered through a Büchner funnel and allowed to dry 16 hours at 55° C. to 2.0% moisture.

Yield—26.3 grams.
Assay—2.6% N, 14.1% drug.
Resin complex odorless and tasteless.

| Elutions | Hour | Percent eluted | |
|---|---|---|---|
| Gastric juice | 1 | 16.4 | 18.2 |
|  | 2 | 8.3 | 7.9 |
|  | 3 | 6.7 | 5.8 |
| Intestinal juice | 4 | 30.0 | 31.0 |
|  | 5 | 22.6 | 21.3 |
|  | 6 | 9.2 | 7.9 |
| Six hour total |  | 93.2 | 92.1 |

The product is useful in amount of 50 mg. per dosage unit as a tranquilizer having sustained release.

EXAMPLE 7

Methyl Scopolamine C-63

68.3 grams hydrated resin Duolite C-63 Na+ equivalent to 56 grams anhydrous resin were added to 20.6 grams methyl scopolamine nitrate dissolved in 1700 ml. deionized water. Stirring was continued for four hours.

The resin complex was washed twice by decantation, filtered by suction and dried at 55° C. to 2.6% moisture.

Yield—62.6 grams.
Assay—1.4% N, 22.7% drug.
Resin complex odorless and tasteless.

| Elutions | Hour | Percent eluted | |
|---|---|---|---|
| Gastric juice | 1 | 34.7 | 34.4 |
|  | 2 | 7.4 | 7.7 |
|  | 3 | 3.3 | 4.0 |
| Intestinal juice | 4 | 9.5 | 10.3 |
|  | 5 | 9.6 | 6.3 |
|  | 6 | 2.6 | 4.2 |
| Six hour total |  | 67.1 | 66.9 |

The product is useful in the treatment of ulcers. A dosage amount of 5 mg. of methyl scopolamine in capsule form is safe and effective for a period of eight hours.

EXAMPLE 8

Ephedrine C-65

40 grams of hydrated Duolite C-65 H+ equivalent to 15 grams anhydrous resin allowed to hydrate with deionized water for one and one-half hours. 15 grams of ephedrine sulfate added to the resin slurry while stirring. Stirring was continued for five hours. Allowed to stand overnight, filtered and dried.

Yield—17.0 grams.
Assay—1.6% N, 18.82% drug.
Resin complex odorless and tasteless.

| Elutions | Hour | Percent eluted | |
|---|---|---|---|
| Gastric juice | 1 | 37.5 | 38.8 |
|  | 2 | 11.2 | 10.0 |
|  | 3 | 4.9 | 4.0 |
| Intestinal juice | 4 | 0.8 | 1.0 |
|  | 5 | 0.8 | 0.8 |
|  | 6 | 0.0 | 0.0 |
| Six hour total |  | 55.2 | 45.6 |

This product was similar to the product of Example 3. It has a sustained release but it was not as uniform acting as the products of Examples 3 and 4 and was just slightly better than ephedrine in its free base or common salt form.

EXAMPLE 9

Niacinamide C-63

71.2 grams hydrated C-63 Duolite resin H+ equivalent to 40.0 grams anhydrous resin was allowed to hydrate in a beaker with 150 ml. deionized water. The moist resin was placed in a column.

40.0 grams niacinamide were dissolved in 500 ml. of deionized water. The drug solution was run through the column.

The resin complex was washed with deionized water and dried for 24 hours at 55° C. to 2.6% moisture.

Yield—36.63 grams dry weight.
Assay—3.3% N, 14.25% drug.
Resin complex odorless and tasteless.

| Elutions | Hour | Percent eluted | |
|---|---|---|---|
| Gastric juice | 1 | 41.8 | 41.8 |
|  | 2 | (¹) | 12.2 |
|  | 3 | 5.2 | 5.2 |
| Intestinal juice | 4 | 3.6 | 3.9 |
|  | 5 | 3.0 | 4.0 |
|  | 6 | 1.3 | 1.7 |
| Six hour total |  |  | 68.8 |

¹ No reading.

This resinate product was only slightly better than niacinamide itself.

EXAMPLE 10

Thiamine C-63

35.1 grams of hydrated Duolite C-63 H+ equivalent to 20.0 grams anhydrous resin were placed in a beaker to hydrate with 100 ml. deionized water. A portion of the moist resin was placed in a column, 1.5 x 60 cm.

15.2 grams thiamine base (as 17.0 grams thiamine HCl) were dissolved in 800 ml. deionized water. The drug solution was passed slowly through the column.

The resin complex was washed with 200 ml. deionized water, filtered by suction and allowed to dry 16 hours at 55° C. to 1.8% moisture.

Yield—13.9 grams.
Assay—17.75% drug, 3.2% N.
Resin complex odorless and nearly tasteless.

| Elutions | Hour | Percent eluted | |
|---|---|---|---|
| Gastric juice | 1 | 16.3 | 21.1 |
|  | 2 | 14.4 | 10.5 |
|  | 3 | 6.5 | 7.0 |
| Intestinal juice | 4 | 3.8 | 4.3 |
|  | 5 | 11.4 | 10.8 |
|  | 6 | 8.4 | 7.8 |
| Six hour total |  | 60.8 | 61.5 |

The resinate (resin complex) can be safely and effectively used in dosage unit amount substantially greater than that of thiamine in base or common salt form. It is useful as a sustained release preparation for the same purposes as thiamine, alone or mixed with pharmaceutically accpetable carriers.

EXAMPLE 11

Dihydrocodeinone C-62

160 grams of hydrated Duolite C-62 H+ equivalent to 158 grams of anhydrous resin were suspended in 800 ml. 5% NaOH and stirred for two hours. The resin was then washed three times with equal volume deionized water by decantation.

40.0 grams of dihydrocodeinone bitartrate were dissolved in 1.5 liters of deionized water and added to the drained resin slurry using an additional 500 ml. deionized water. Stirring was continued for 3½ hours.

The resin complex was washed three times with equal volumes deionized water by decantation, filtered by suction and allowed to dry for 22 hours at 55° C. to 4.0% moisture.

Yield—197.6 grams.
Assay—8.17% drug, 0.38% N.
Resin complex odorless and tasteless.

| Elutions | Hour | Percent eluted |
|---|---|---|
| Gastric juice | 1 | 27.4 |
|  | 2 | 23.9 |
|  | 3 | 3.75 |
| Intestinal juice | 4 | 2.4 |
|  | 5 | 2.2 |
|  | 6 | 2.1 |
| Six hour total |  | 61.8 |

The resinate (resin complex) is also useful as a sustained release anti-tussive preparation.

EXAMPLE 12

Dimethyl Aminoethanol 30.8 grams of hydrated Duolite C–62 resin H+ equivalent to 25.0 grams anhydrous resin were allowed to hydrate with 100 ml. of deionized water.

To the resin slurry, 25.0 grams dimethyl amino-ethanol were added and the mixture was stirred for two hours.

The resin complex was washed by decantation, filtered and allowed to dry at 55° C. to 3.0% moisture.

Yield—32.3 grams dry weight.
Assay—29.5% drug, 4.6% N.
Resin complex odorless and tasteless.

| Elutions | Hour | Percent eluted |
|---|---|---|
| Gastric juice | 1 | 85.86 |
|  | 2 | 1.02 |
|  | 3 | 0.76 |
| Intestinal juice | 4 | 0.76 |
|  | 5 | 0.46 |
|  | 6 | 0.39 |
| Six hour total |  | 89.25 |

The resinate (resin complex) is useful as an odorless, tasteless, easily formulated pharmaceutical ingredient.

EXAMPLE 13

Phenyltoloxamine C–63

98.7 grams of hydrated Duolite C–63 H+ equivalent to 55.5 grams anhydrous resin were regenerated to the Na+ form with 400 ml. 5% sodium hydroxide.

42.9 grams of phenoyltoloxamine dihydrogen citrate were dissolved with heat and stirring in 1.7 liters of deionized water. The drug solution was added to the resin slurry and stirring was continued for three hours.

The resin complex was washed by decantation, filtered by suction and dried for 16 hours at 55° C. to 4.4% moisture.

Yield—74.8 grams dry weight.
Assay—40.4% drug, 2.80% N.
Resin complex is odorless and tasteless.

| Elutions | Hours | Percent eluted | |
|---|---|---|---|
| Gastric juice | 1 | 11.8 | 11.5 |
|  | 2 | 4.5 | 4.0 |
|  | 3 | 2.8 | 2.7 |
| Intestinal juice | 4 | 1.2 | 0.9 |
|  | 5 | 1.1 | 1.2 |
|  | 6 | 1.1 | 1.3 |
| Six hour total |  | 22.5 | 21.6 |

This resinate is also useful as a sustained release antihistaminic preparation as well as an odorless and tasteless product. It has a particularly slow rate of release but can be used in a safe and effective amount in a dosage unit such as a capsule, tablet or suspension, sufficient in amount to last at least eight hours.

EXAMPLE 14

Chlorpheniramine C–63

46.7 grams of hydrated Duolite C–63 resin H+ equivalent to 26.3 grams of anhydrous resin were regenerated to the Na+ form with 200 ml. of 5% sodium hydroxide.

12.5 grams of chlorpheniramine maleate were dissolved in 420 ml. deionized water. The drug solution was added to the resin slurry and stirred for three hours.

The resin complex was washed by decantation three times, filtered by suction, allowed to dry 16 hours at 55° C. to 15.6% moisture.

Yield—29.6 grams dry weight.
Assay—25.0% drug, 2.48% N.
Resin complex odorless and tasteless.

| Elutions | Hours | Percent eluted | |
|---|---|---|---|
| Gastric juice | 1 | 48.3 | 48.4 |
|  | 2 | 10.1 | 10.1 |
|  | 3 | 4.0 | 3.8 |
| Intestinal juice | 4 | 0.8 | 1.6 |
|  | 5 | 0.8 | 1.0 |
|  | 6 | 0.8 | 1.1 |
| Six hour total |  | 64.8 | 66.0 |

This resin complex (resinate) is superior to the base as a sustained release anti-histaminic preparation, and has the additional advantage of being tasteless and odorless.

EXAMPLE 15

Methaqualone C–63

29.0 grams of hydrated Duolite C–63 H+ resin, equivalent to 20.0 grams of anhydrous resin were placed in a beaker with 100 ml. of deionized water.

10.0 grams of methaqualone were dissolved in 400 ml. of 70% ethanol with stirring. The drug solution was added to the resin slurry and the mixture stirred for four hours.

The resin complex was washed by decantation, filtered by suction and oven dried at 55° C. to 2.8% moisture.

Yield—23.1 grams.
Assay—15.1% drug, 1.92% N.
Resin complex odorless and tasteless.

| Elutions | Hours | Percent eluted | |
|---|---|---|---|
| Gastric juice | 1 | 2.0 | 1.7 |
|  | 2 | 1.3 | 1.3 |
|  | 3 | 1.0 | 1.0 |
| Intestinal juice | 4 | 34.0 | 30.6 |
|  | 5 | 25.8 | 24.0 |
|  | 6 | 12.4 | 11.2 |
| Six hour total |  | 76.5 | 69.8 |

This resinate is useful, as a sustained release, odorless and tasteless pharmaceutical product useful as a muscle relaxant.

EXAMPLE 16

Amphetamine C–63

57.9 grams of hydrated Duolite C–63 H+ equivalent to 40.0 grams anhydrous resin were hydrated with 50 ml. of deionized water.

10.0 grams of dl-amphetamine base equivalent to 10.95 ml. were added to 600 ml. of deionized water with stirring. The drug solution was added to the resin slurry and the mixture stirred for four hours.

The resin complex was washed by decantation, filtered by suction and dried for 16 hours at 55° C. to 6.8% moisture.

Yield—48.7 grams dry weight.
Assay—24.05% drug, 2.8% N.
Resin complex odorless and tasteless.

| Elutions | Hours | Percent eluted | |
|---|---|---|---|
| Gastric juice | 1 | 24.5 | 23.3 |
|  | 2 | 8.0 | 6.5 |
|  | 3 | 4.6 | 4.1 |
| Intestinal juice | 4 | 11.3 | 12.0 |
|  | 5 | 11.2 | 12.5 |
|  | 6 | 9.9 | 8.6 |
| Six hour total |  | 69.5 | 67.0 |

This resinate is a tasteless and odorless product useful in unit dosage amounts of 20 mg. (as base) as a safe and effective sustained release appetite suppressant, effective for at least eight hours on oral administration to an adult human.

EXAMPLE 17

*Phenyl-Tert-Butylamine C–63*

65.1 grams of hydrated Duolite C–63 H+ equivalent to 45.0 grams of anhydrous resin were suspended in 50 ml. of deionized water.

5.0 grams of phenyl-tert-butylamine were added to 300 ml. of deionized water with stirring. The drug solution was added to the resin slurry and the mixture stirred for four hours.

The resin complex was washed by decantation, filtered by suction, and dried for 16 hours at 55° C. to 11.6% moisture.

Yield—48.4 grams dry weight.
Assay—15.05% drug, 1.97% N.
Resin complex odorless and tasteless.

| Elutions | Hours | Percent eluted | |
|---|---|---|---|
| Gastric juice | 1 | 9.7 | 10.2 |
|  | 2 | 4.3 | 6.8 |
|  | 3 | 4.6 | 4.5 |
| Intestinal juice | 4 | 22.9 | 23.7 |
|  | 5 | 24.0 | 22.7 |
|  | 6 | 17.9 | 16.5 |
| Six hour total |  | 83.4 | 84.4 |

This product in 30 mg. dosage unit amount is useful as a sustained release appetite suppressant, effective and safe for a period of eight hours and longer.

EXAMPLE 18

*Chlorpromazine C–63*

29.0 grams of hydrated Duolite C–63 H+ equivalent to 20.0 grams of anhydrous resin were regenerated to the Na+ state. The resin was suspended in 300 ml. of deionized water.

22.3 grams of chlorpromazine HCl equivalent to 20.0 grams of drug base were dissolved in 200 ml. of deionized water, and added to the resin suspension while stirring. Stirring was continued for three hours. 750 ml. of ethanol were added and the mixture was stirred for an additional 50 minutes. It was then placed in a refrigerator for 16 hours at 5° C.

The resin complex was filtered, washed with ethanol and oven dried at 55° C. to 7.5% moisture.

Yield—27.5 grams dry weight.
Assay—25.3% drug, 2.6% N.
Resin complex odorless and tasteless.

| Elutions | Hours | Percent eluted | |
|---|---|---|---|
| Gastric juice | 1 | 6.2 | 4.9 |
|  | 2 | 4.0 | 3.6 |
|  | 3 | 2.9 | 2.6 |
| Intestinal juice | 4 | 0.8 | 0.6 |
|  | 5 | 0.6 | 0.4 |
|  | 6 | 0.4 | 0.4 |
| Six hour total |  | 14.9 | 12.5 |

This resin complex (resinate) has, by the elution tests, a very slow rate of release. It is believed to be safe and effective as an odorless and tasteless CNS depressant and as a slow-release preparation. Animal and clinical tests are being conducted to confirm the above. Promazine substituted for chlorpromazine gives a similar resin complex suitable as a tranquilizer.

It has been discovered that the rate of release of drugs from phosphorus containing cation exchange resins having basic drugs adsorbed thereon varies with the type of drug adsorbed. Thus, in the case of amphetamine, ephedrine, and like drugs the fine particle size resin adsorption compounds, such as that of −200 mesh, are not suitable for eight hour sustained release when made with the phosphorus containing cation exchange resins having 6 to 8 percent cross linkage; but such adsorption compounds when of −10 to +50 mesh particle size are very valuable for sustained release preparations. On the other hand other phosphorus containing resin drug adsorption compounds such as those containing antihistamines and narcotic nitrogen heterocyclic compounds give superior results when used in particle size of −30 to +400 mesh.

Moreover, in many instances fine particle size adsorption compounds of −80 to +400 and finer are desirable over coarse particles even in bead form in order to have less irritation of the gastro-intestinal tract and particularly in order to have a smoother preparation when administered in the form of syrup or other aqueous suspension. By controlling the cross linkage, as below discussed, we can make sustained release preparations even with −20 to +400 mesh particles of phosphorus containing cation exchange resin adsorption compounds of amphetamine, ephedrine, and like amines.

By suitable cross linkage, preferably also with controlled particle size, there can be made a drug adsorption compound in which not more than 50 percent of the bound drug is released by a one-hour elution with simulated gastric juice, and preferably at least 10 percent is released by such juice in three hours, whereby the adsorption compound (calculated as drug base) can be given in twice the average dose of the unadsorbed drug base, or its common salt (calculated as drug base), without any greater toxicity or untoward side effects than that of said average dose of the drug base or common salt. This makes possible the oral administration of a drug at intervals twice as long as its normal interval, for example, once every 12 hours or more instead of three or four times per day.

The 50 percent upper limit of release of bound drug, while not a strict limitation for all purposes is a practical upper limit. Likewise the 10 percent lower limit can be a practical lower limit but it has been found that with 10 percent and higher, release in gastric juice in three hours is such that most of the drug is utilized before being eliminated from the body.

The details of a standard test, which was utilized for obtaining all of the elution data disclosed in this case, except where indicated otherwise, are given in column 13.

Methods for determining the rate of elution of drugs from drug resin complexes:

I. THE PERCOLATION METHOD (STANDARD TEST UPON WHICH CLAIMS ARE BASED

This method utilizes a piece of equipment containing a 25 millimeter coarse, sintered glass disk sealed to a glass reservoir located approximately 12 inches above it. Underneath the reservoir is connected a stopcock which is utilized to regulate the flow of the gastric or intestinal juice which is placed in the reservoir, so that it percolates through the disk at a rate of 50 ml. per hour. A weighed sample of the resin complex equivalent to 100 mgs. of the drug calculated as the base is placed on the sintered glass disk and three successive 50 ml. portions of simulated gastric juice are permitted to percolate through it over a period of one hour each. The portions are each collected for analysis. After the third 50 ml. portion of gastric juice is collected, the fluid above the resin complex is replaced with simulated intestinal juice, and collection is made of the intestinal juice passing through the resin complex for three successive hours at the rate of 50 ml. per hour. All six samples are then analyzed for their drug content. The amount of drug appearing in each 50 ml. portion is then calculated in terms of the percent of the total drug which was initially used.

The cross linkage of the phosphonous, phosphonic, and phosphoric acid cation exchange resins and consequently that on the adsorption compound produced with amines, heterocyclic nitrogen compounds, and other organic compounds containing a basic nitrogen group is suitably between approximately 1.0 percent and 20.0 percent and the particle size may vary between approximately 10 mesh and 400 mesh, the finer particle sizes being used with the higher cross linkage.

The properties of the adsorption compound will also vary with the type of drug used. In general, for the beta phenalkyl amines and like adrenergic amines, such as amphetamine and ephedrine, with a cross linkage of approximately 5 to 9 percent, a suitable particle size is between 10 and 20 mesh. Coarser particle size than 10 mesh can be used but it is not generally practical, and for finer particle size than 50 mesh the cross linkage is preferably greater than 9 percent. For many other amines and tertiary and quaternary amines and for nitrogen heterocyclic compounds where the phosphorus containing cation exchange resin is cross linked to 5 to 9 percent, the particle size of the resin complex should preferably be between 20 and 400 mesh. With coarser particle size or higher cross linkage the release in one hour becomes smaller and the dosage amount must be increased.

The types of drug which are suitable for use as adsorption compounds in this invention are organic compounds containing a basic nitrogen group and which in their base or common salt form have been orally administered to a patient for therapeutic purposes. They, of course, are absorbable in the gastro-intestinal tract, so that they get into the blood stream. The invention is particularly advantageous for pharmaceutical, basic drugs which have a toxicity such that they cannot be administered to a patient in twice their normal or average dosage amount without deleterious side effects, and which must be administered more than once in 12 hours. Its great advantage nevertheless, as pointed out above, is with drugs which have an oral LD–50 in rats substantially less than that of most antibiotics, as for example amines and nitrogen heterocyclic compounds which in base form have an oral LD–50 in rats of less than 3000 mg./kg. of rat. It can even be used for basic drugs having an LD–50 slightly lower than that of the most toxic orally administered drugs known, such as amines having an oral LD–50 of 10 mg./kg. of rat.

The broad class of compounds which can be adsorbed on phosphorus containing cation exchange resins as above indicated are the organic compounds containing a basic nitrogen group in the molecule.

This broad class may be divided into the narrower categories, each of which has different elution and gastro-intestinal release properties, and requires different correlations of particle size and cross linkage, for 8 hours or longer release.

The following classification outline is given for the purpose of aiding in an understanding of the breadth and variations of the invention.

I. Therapeutically effective organic compounds containing a basic nitrogen group:
  A. Organic amines in which an amine group is the sole basic nitrogen group—
    (a) Adrenergic:
      Amphetamine
      Ephedrine
    (b) Antihistaminics:
      Diphenhydramine
      Phenyltoloxamine
    (c) Antispasmodics:
      Aminophentamide
      Tridihexethyl iodide
    (d) Ataractics: benactyzine hydrochloride
    (e) Antihypertensives:
      Hexamethonium
      Pentamethonium B. Organic compounds containing a heterocyclic nitrogen group—
    (1) Organic compounds in which is heterocyclic nitrogen group is the sole basic nitrogen group:
      (a) Alkaloids—
        (aa) Phenanthrene opiates:
          Morphine
          Codeine
        (bb) Benzylisoquinoline opiates:
          Papaverine
          Ethaverine
        (cc) Solanaceae:
          Atropine
          Scopolamine
      (b) Quaternary—
        Methyl atropine
        Methyl scopolamine
      (c) Non-alkaloid—
        (aa) Morpholines: phenmetrazine
    (2) Organic compounds containing basic nitrogen groups consisting of heterocyclic nitrogen groups and amine groups:
      (a) Antihistaminics—
        Chlorpromazine
        Chlorpheniramine
        Pyrilamine
      (b) Urinary analgesic—2,6 - diamino - 3- phenylazopyridine The following Table I shows a comparison of unit dosage amounts and average time of effectiveness of such amounts for drug common salts and the drug-phosphonic acid resin salt exemplified by Duolite C–63 substantially saturated with the ionically bound drug; mesh size −16 to +50 (U.S. Standard Screen Series); unless otherwise indicated by "#" after dose amount whereby mesh size is −100 to +400.

Table I

PRIMARY AMINES

| Drug base | Common salt | Dose of common salt (mg. of base) | Dose of Resin Salt (mg. of base) | Period of E,[1] hours | Period of E,[2] hours | Use |
|---|---|---|---|---|---|---|
| α-Methylphenethylamine (amphetamine) | Sulphate | 3.6 | 10.0 | 4 | 12 | Appetite suppressant. |
| Phenyl tertiary butylamine | Hydrochloride | 10.0 | 20.0 | 4 | 12 | Do. |

SECONDARY AMINES AND HETEROCYCLIC NITROGEN COMPOUNDS

| Drug base | Common salt | Dose of common salt (mg. of base) | Dose of Resin Salt (mg. of base) | Period of E,[1] hours | Period of E,[2] hours | Use |
|---|---|---|---|---|---|---|
| α-Phenyl-α-hydroxy-β-methyl amino propane (ephedrine). | Sulphate | 19.3 | 50 | 3 | 10 | Antiasthmatic. |
| N₁α-dimethylphenethyl amine (desoxy ephedrine). | Hydrochloride | 2.6 | 5 | 6 | 12 | Appetite suppressant. |
| Mecamylamine (Inversine) | do | 2.1 | 5 | 6 | 12 | Hypotensive. |
| Methyl-α-phenyl-α-(2-(piperidyl) acetate (Ritalin). | do | 8.6 | 10 | 8 | 14 | Mood elevator. |
| -methyl-2-phenylmorpholine (phenmetrazine-Preludin). | do | 20.7 | 25 | 10 | 14 | Appetite suppressant. |

TERTIARY AMINES AND HETEROCYCLIC NITROGEN COMPOUNDS

| Drug base | Common salt | Dose of common salt (mg. of base) | Dose of Resin Salt (mg. of base) | Period of E,[1] hours | Period of E,[2] hours | Use |
|---|---|---|---|---|---|---|
| 2[benzyl (2-dimethylaminoethyl) amino] pyridine (pyribenzamine). | Hydrochloride | 43.8 | 75# | 6 | 12 | Antihistaminic. |
| 2[p-chloro-a(2-dimethylamino ethyl benzyl] pyridine (Chlortrimeton). | Maleate | 2.6 | 5# | 6 | 12 | Do. |
| 2,6 diamino-3-phenylazopyridine | Hydrochloride | 85.4 | 100 | 4 | 12 | Urinary analgesic. |
| 2[2-dimethylamino ethyl (p-methoxy benzyl) amino] pyridine (Pyrilamine). | Maleate | (17.7–35.4) | 25–150 | 8 | 12 | Antihistaminic. |
| N₁N-dimethyl-2(a phenyl-o-toloxy) ethylamine (Phenyltoloxamine). | Citrate | 28.7 | 25–150# | 6 | 12 | Do. |
| 10(3-dimethylaminopropyl) phenothiazine (Promazine). | Hydrochloride | (21.7–86.6) | 25–150 | 6 | 12 | Tranquilizer. |
| Codeine | Sulphate | (22.8–91.5) | 30–120# | 4 | 12 | Analgesic. |
| Dihydrocodeine | Bitartrate | 20–80 | 60–180# | 4 | 12 | Do. |
| Dihydrocodeinone | do | (3.1–7.3) | 5# | 4 | 12 | Antitussive. |
| Metopon | Hydrochloride | 2.7 | 5–25 | 4 | 12 | Analgesic. |
| Atropine | Sulphate | (.22–.44) | .5–2.0 | 6 | 12 | Antispasmodic. |
| Dihydrohydroxycodeinone | Hydrochloride | 4.0 | 5–25# | 4 | 12 | Analgesic. |
| Scopolamine | Bromide | (.35–.7) | (1.0–4.0)# | 4 | 12 | Antispasmodic. |
| α,α-Diphenyl-γ-(dimethylamine) valeramide (Centrine). | Sulphate | .37 | .5–2.0 | 6 | 12 | Do. |
| 2-diethylamino ethyl-benzilate (Benactyzine). | Hydrochloride | .9 | 5–20 | 6 | 12 | Tranquilizer. |
| 1-chloro-10(3-dimethyl-amino-propyl) phenothiazine (Chlorpromazine). | do | (22.5–90) | (100–500) | 10 | 14 | Do. |
| Noscapine | Base | (15–30) | 25–60# | 6 | 12 | Antitussive. |
| 6,7 diethoxy-1-(3,4-diethoxy-benzyl) iso quinoline (ethaverine). | do | 30 | 50–150 | 10 | 14 | Smooth muscle-relaxant. |

QUATERNARY AMINES AND NITROGEN HETEROCYCLIC COMPOUNDS

| Drug base | Common salt | Dose of common salt (mg. of base) | Dose of Resin Salt (mg. of base) | Period of E,[1] hours | Period of E,[2] hours | Use |
|---|---|---|---|---|---|---|
| 3-diethylamino-1-cyclohexyl-1-phenyl-1-propanol ethiodide (Pathilon). | Iodide | 17.9 | 50–200# | 4 | 12 | Antispasmodic. |
| 4,5,6,7 tetrachloro-2-(2-dimethyl amino ethyl) isoindoline dimethyl chloride (Ecolid). | Chloride | (8.3–83) | 25–150# | 8 | 16 | Hypotensive. |
| Methyl atropine | Nitrate | .8 | 3–10# | 2 | 8 | Antispasmodic. |
| Methyl scopolamine | do | 1.7 | 4–26# | 4 | 12 | Antisecretory. |
| Tricyclamol (Elorine) | Methyl sulphate. | (34.5–104) | (100–300) | 6 | 12 | Do. |

NOTE.—E[1] is effectiveness of common salt. E[2] is effectiveness of resin salt.

The dosage ranges set forth in the above Table I are the recommended ranges for the conditions given. They are also the recommended ranges for other suitable conditions of resin adsorption compounds such as those set forth above for resin adsorption compounds in which the drugs are eluted at not more than 50 percent of the total in one hour of elution with simulated gastric juice.

An illustrated formula of a suitable cation exchange resin adsorption product of an amine, R' representing a resin nucleus, is:

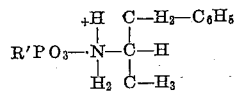

The above formula is for a phosphorus containing cation exchange resin having a cation of amphetamine adsorbed (ionically bound) thereon. It will be noted that the product is a compound, actually a resin salt obtained by the reaction of an acid (the phosphorus containing acid resin) with an alkali (the amine). The reaction may also be represented in simplified form, as follows:

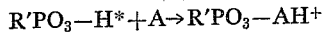

where R'PO₃— represents the resin anion, A is the amphetamine as the free base, and AH+ is the amphetamine cation.

It will be seen that the dosage ranges vary enormously with different amines and heterocyclic nitrogen compounds, from .2 mg. to 2000 mg., but the general preferred common feature is that the minimum unit dosage amount of the drug base in the adsorption compound is substantially greater than the average unit dose of the drug base or the common salt, such as the hydrochloride or phosphate, and can be at least twice that of the average unit dosage amount for these common compounds. The amount of drug base in a unit dose of the resin adsorption compound of this invention can be, and generally is, in order to obtain long lasting effect, substantially greater than the amount of drug base in the maximum normal unit dose of the common salt or of the free base itself.

The term "minimum unit dose" of drug is herein defined as the minimum amount of drug base orally administered at one time to a patient in the form of the free base or the common salt which is therapeutically effective as determined by clinical tests on a representative group of adult patients, and then taking the average therapeutic amount per patient.

The term "maximum normal unit dose" is herein defined as the maximum amount of drug base orally administered at one time to a patient in the form of the free base or the common salt which is therapeutically effective wtihout substantial untoward side effects (nontoxic), as determined by clinical tests on a representative group of patients, and then taking the average determined amount per patient. For the purpose of this application, the minimum unit dose and the maximum normal unit dose are respectively the minimum and maximum unit dosage amounts accepted by or acceptable to the U.S. Food and Drug Administration. The term "average unit dose" or "optimum unit dose" is the average of the minimum unit dose and the maximum normal unit dose. The dosage amounts can also be obtained by taking the minimum and maximum dosage amounts for the drug given in various medical books and converting the amount, if necessary, to free base; see particularly the Physician's Desk Reference, published by Medical Economics, Inc. Where only one amount is given, this amount is the "average amount" unless otherwise indicated.

The dosage unit compositions of this invention can contain other ingredients besides the phosphorus containing resin adsorption compounds. The adsorption compound itself in general will not have more than 50 percent of bound drug, even when saturated. The remainder of the resin adsorption compound acts as a diluent and a carrier, and has been found to have no harmful effect on the system when used in dosage amounts below 2000 mg. of drug base. Indeed, it has been found that more than about 2000 mg. of unreacted phosphorus containing cation exchange resins may be mixed with the amine or nitrogen heterocyclic compound reacted resin without deleterious effect in the cation balance of the body. Other completely pharmaceutical innocuous carriers can be used in the dosage composition, such as methylcellulose, carboxymethyl cellulose, clay, and the like. Also, various antacids may be added. In general, the amount of carrier and other added material should be such that the amount of drug as drug base in a dosage unit is not less than approximately two percent by weight. Amounts of drug base of 20 and 50 percent and higher are suitable.

The dosage unit composition can contain unadsorbed or free drug, but in general this is not advisable since it increases the initial peak effect. The amount of unadsorbed or free drug having substantially the same oral LD–50 in rats as the adsorbed drug should preferably be below 50 percent of the bound drug. And, for the best results, the total of such free drug and the drug released by the simulated gastric juice from the adsorption compound in one hour should not be more than 50 percent, such as 90 percent of the total drug content. Even with the relatively toxic amines and heterocyclic nitrogen compounds, higher amounts than 50 percent can be used because there is still obtained a substantial reduction in the peak effect over that using pure unadsorbed amine or other basic drug.

It will be seen that the unit dose for the resin salt is substantially more than that of the unit dose of the common salt and the period of effectiveness is also substantially more. Just as important as the fact the period of effectiveness is substantially greater is the fact (not shown in the table) that the toxicity and deleterious side effects have not increased. Animal tests show that when less than 50 percent of each of the above amines and nitrogen heterocyclic compounds are eluted in one hour by .07 N HCl with .03 N NaCl from the resin adsorption compound, the average unit dose can be at least doubled and the oral LD–50 in rats is more than doubled.

When the drug release is retarded, a greater amount of drug can be administered without making available at any one time a sufficient amount of free drug to cause death.

In order to reduce the LD–50 by means of a resin-complex formation by a factor of two (and thus be able to administer at least twice the average dose of drug in its common form) it is necessary to have a substantial proportion of the total drug content held in the matrix and unavailable for release at physiological cation concentrations within a period as long as one hour. This condition is met when not more than 50 percent of the drug is eluted with simulated gastric juice in one hour. The elution may be by batch immersion of the resin in an excess of simulated gastric juice so that the acid concentration remains substantially constant or by percolation with simulated gastric juice.

The resin complexes of this invention can be used as such or they can be mixed with other pharmaceutically compatible ingredients or excipients. For example, it may be desired to give the complex in capsules, pills, tablets, or as a powder, or even in syrups, elixirs, or emulsions. The resin complex can be intermixed with flavoring and coloring materials, clay, bentonite, antacids such as hydrated magnesium trisilicate, bismuth suboxide, zirconium subcarbonates, sodium alginate, emollients such as methylcellulose, gastric mucin, carboxymethyl cellulose, and the like, or with naturally occurring gums and mucilages, gelatin, amino acids, peptones, and peptides.

The antihistaminic amines and nitrogen heterocyclic compounds are particularly suitable to compound with phosphonic acid cation exchange resins and other phosphorous containing cation exchange resins since these compounds in the form of their common salts have such deleterious side effects that they must be orally administered in unit dosage amounts which are effective only four hours or less, and in order to maintain the effect they are given generally before or after each meal. All of the antihistaminic nitrogen compounds when chemically combined with a phosphorus containing cation exchange resin (following the principles of particle size and cross linkage explained above) can be given in a unit dose containing at least twice the average dose of drug base as is in the common antihistaminic salt, having an oral LD–50 in rats of at least twice the common salt, and are effective eight hours or longer.

All basic nitrogen containing antihistaminic agents can be reacted with phosphorus containing cation exchange resin to obtain pharmaceutical preparations which have 10 hour or greater sustained effectiveness without deleterious side effects. Suitable compounds have the general formula: R—X—C—C—N where X is nitrogen, oxygen or carbon connecting the side chain to the nucleus. Generally the nucleus should have a minimum of two aryl or aralkyl groups (or equivalent in a polycyclic ring system). Suitable specific antihistamines for use in this invention are all those disclosed in the Second Edition, Chapter 42, pages 627 and 628, of Pharmacology in Medicine, by Victor A. Drill. The Table 41–1 is incorporated in this application by reference.

Particularly satisfactory results are obtained with the salts of phosphonic acid cation exchange resins and antihistaminic bases having the formula:

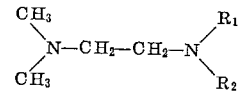

wherein $R_1$ is the pyridyl group

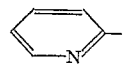

and $R_2$ is the benzyl group

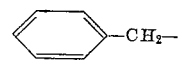

a substituted benzyl group or one of the isosteres of the benzyl group, such compounds including pyrilamine (Neo-Antergan), metapyrilene (Histadyl), chlorothen (Tagathen), thenyldiamine (Thenfadil), thozylamine (Neohetramine) and methafurylene (Foralamin). Highly satisfactory cation exchange resins are the water insoluble phosphonated polymerizates of poly vinyl aryl compounds such as these diclosed in U.S. Patent 2,844,546 and 2,911,378. Especially satisfactory results from the point of view of sustained release have been obtained by reacting an antihistaminic base with a water insoluble phosphonated polymerizate of a mixture comprising divinyl benzene and styrene, the polymerizate being cross-linked to the extent of about 6–8 percent, and the final resin salt having a particle size of between approximately 10 and 80 mesh.

The cation exchange resins having both phosphonate and sulfonate groups such as those disclosed in U.S. Patents 2,764,561 and 2,764,563 can also be used. It is contemplated that cation exchange resins having thiophosphonate groups will react with basic drugs and be similarly suitable, such as those disclosed in U.S. Patent 2,764,564.

An illustrated formula of a suitable cation exchange resin salt of an antihistaminic base is given below, A representing a resin nucleus:

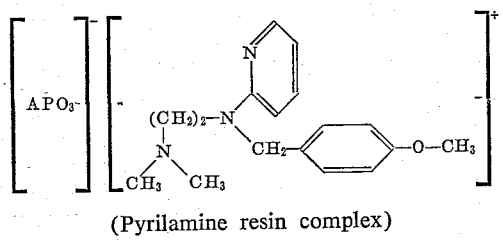

(Pyrilamine resin complex)

Following is an example of a suitable narcotic resin suspension:

2.63 gms. dihydrocodeinone phosphonic acid resin complex made by the process of Example 5 are blended with sufficient suspending menstrum to make one liter of suspension containing 1 mg. per milliliter of dihydrocodeinone base.

The compound which has superior antitussive effect over other morphine compounds is the resinous adsorption compound of dihydrocodeinone. The dosage unit as a cough suppressant for this preparation is a minimum of approximately 3 mgs. of preparation on the basis of dihydrocodeinone. The maximum dosage in order to avoid deleterious side effects, such as nausea, etc., is approximately 60 mgs. of the dihydrocodeinone daily.

The dihydrocodeinone resin adsorption compound is suitably given to the patient in 5 mg. amounts (on the basis of the amount of pure drug) once every 12 hours.

The codeine resinous adsorption compound, like codeine itself, has some antitussive effect, but is particularly valuable as an analgesic. For this latter purpose it is suitably present in the resinous adsorption compound in from three mgs. to 60 mgs.

My invention includes sustained release tranquilizer and antispasmodic preparations. Applying the principles of particle size and cross linkage set forth above, amine tranquilizers and antispasmodics can be reacted with a phosphorus containing cation exchange resin to give an adsorption compound which can be used in a unit dosage amount substantially greater than the average dosage amount of the unadsorbed drug, such as in twice the average dosage amount or in an amount sufficient to last 8 to 16 hours and longer.

Another object of this invention is to provide a water insoluble quaternary ammonium derivative of scopolamine which gives a slow release of scopolamine alkyl halide in the stomach and which passes into the intestines for further uniform slow release of the active drug.

The foregoing and additional objects have been accomplished by reacting scopolamine lower alkyl salts with phosphorus containing cation exchange resins, particularly with phosphonic acid cation exchange resins, and preferably using resins having a particle size of between −20 and +400 mesh. The novel compounds produced by this reaction are water insoluble salts in which the anion of the water soluble scopolamine alkyl salt such as, for example, the halide or nitrate of the scopolamine alkyl salt, is replaced by the anion of the cation exchange resin. These materials can be represented by the following structural formula:

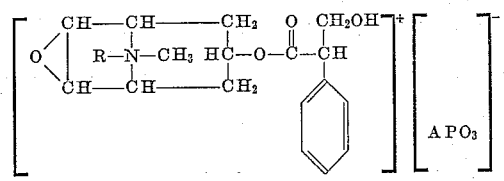

wherein R is a lower alkyl group, such as methyl, ethyl, propyl, and butyl, and A is a resin nucleus of a phosphorus containing cation exchange resin.

The compounds of this invention are water insoluble quaternary ammonium salts of scopolamine. The compound above referred to can also be referred to as a phosphorus containing cation exchange resin having adsorbed thereon (or ionically bound thereto) a cation of a scopolamine lower alkyl salt. The cation, of course, is the same regardless of the type of salt and thus may be the cation of scopolamine lower alkyl chloride, bromide, nitrate, or the like.

The compounds of this invention can be readily made by reacting a cation exchange resin with a solution of the scopolamine lower alkyl salt, such as, for example, by contacting a phosphonic acid cation exchange resin with an aqueous solution of scopolamine lower alkyl chloride.

All types of cation resins will react with scopolamine lower alkyl salts. The carboxylic type cation exchange resins are well known and will react with the scopolamine quaternary salts to give water insoluble resinous adsorption compounds. However, such compounds hydrolyze too quickly with the gastric juices of the stomach and are little, if any, better than the unadsorbed scopolamine compound itself. On the other hand, phosphonic cation exchange resins react with the scopolamine lower alkyl salts to give water insoluble quaternary compounds which satisfy the objects of this invention.

The resin adsorption compounds of this invention are preferably substantially saturated with the drug. Saturation will generally run from about 10 percent to 50 percent, depending upon the drug and the time of contact with the phosphonic acid cation exchange resin. However, the resin does not necessarily have to be saturated, and as little as 1.0 percent and less of the adsorption drug can be present.

The terms "simulated gastric juice" and "simulated intestinal juice" as used in this specification mean the simulated gastric juice less enzymes and simulated intestinal juice less enzymes described in the U.S. Pharmacopoeia, vol. XV, pp. 1094–1095, except for the omission of enzymes. The simulated gastric juice consists essentially of .07 N HCl containing .03 N NaCl. The simulated intestinal juice consists essentially of .039 N NaOH and .05 N $KH_2PO_4$.

This application is a continuation in part of the application of John W. Keating, Serial No. 726,010, filed April 2, 1958, now Patent 2,990,332, which application is a continuation in part of Keating application Serial No. 582,346, filed May 3, 1956, now abandoned.

I claim:

1. A pharmaceutical preparation comprising a phosphorus containing cross-linked cation exchange resin selected from the group consisting of phosphonic, phosphonous and phosphoric cation exchange resins having adsorbed thereon a pharmaceutical amine which is normally administered to an adult human more than once per twelve hour period, the cross-linkage and particle size of the cation exchange resin being such as to render the amine effective when said preparation is orally administered over a substantially greater period of time than when said amine is orally administered in equal amount in free base form.

2. A pharmaceutical preparation in dosage unit form comprising a therapeutic and non-toxic amount of cation exchange resin selected from the group consisting of phosphonic, phosphonous, and phosphoric cation exchange resins having an organic drug compound containing a basic nitrogen group ionically bound to the resin to form an adsorption compound, said organic drug being selected from the group consisting of amphetamine, ephedrine, phenyl tertiary butylamine, dihydrocodeinone, methyl scopolamine, amphenidone, promazine, methaqualone, chlorpromazine, phenyltoloxamine, and chlorpheniramine.

3. A pharmaceutical composition in dosage unit form comprising a phosphorus containing cation exchange resin selected from the group consisting of phosphonic, phosphonous and phosphoric cation exchange resins having adsorbed thereon an organic drug compound containing a basic nitrogen group, said organic drug compound in free base form having an LD–50 in rats of between approximately 10 and 3000.

4. The pharmaceutical preparation of claim 3 wherein the drug is a dihydrocodeinone.

5. The pharmaceutical preparation of claim 3 wherein the drug is methylscopolamine.

6. The pharmaceutical preparation of claim 3 wherein the organic drug is a heterocyclic nitrogen compound.

7. The pharmaceutical preparation of claim 3 wherein the organic drug is an amine.

8. The pharmaceutical preparation of claim 7 wherein the amine is a beta arylalkyl amine.

9. The pharmaceutical preparation of claim 8 wherein the amine is amphetamine.

10. The pharmaceutical preparation of claim 8 wherein the amine is phenyl tertiary butylamine.

11. The pharmaceutical preparation of claim 3 wherein the resin nucleus is a polystyrene resin cross linked with divinylbenzene to the extent of 1 to 20 percent.

12. The pharmaceutical preparation of claim 11, said resin having adsorbed thereon a beta phenalkylamine.

13. The pharmaceutical preparation of claim 11, said resin having adsorbed thereon phenyl tertiary butylamine.

14. The pharmaceutical preparation of claim 11, said resin having adsorbed thereon amphetamine.

15. The pharmaceutical preparation of claim 11, said resin having adsorbed thereon a basic morphine compound.

16. The pharmaceutical preparation of claim 11, said resin having adsorbed thereon ephedrine.

17. The pharmaceutical preparation of claim 11, said resin having adsorbed thereon chlorpromazine.

18. The pharmaceutical preparation of claim 11, said resin having promazine adsorbed thereon.

19. The pharmaceutical preparation of claim 11, said resin having amphenidone adsorbed thereon.

20. The pharmaceutical preparation of claim 11, said resin having adsorbed thereon methyl scopolamine.

21. The pharmaceutical preparation of claim 11, said resin having adsorbed thereon niacinamide.

22. A pharmaceutical preparation for oral administration to a patient, comprising in dosage unit form a therapeutically effective amount of a cation exchange resin selected from the group consisting of phosphonic, phosphonous, and phosphoric cation exchange resins having a gastro-intestinal adsorbable pharmaceutical organic drug containing a basic nitrogen group ionically bound to the resin to form an adsorption compound; the cross linkage of the resin of the adsorption compound being between approximately 1 to 20 percent and the particle size of the adsorption compound being between approximately 10 mesh and 400 mesh, and the cross linkage and particle size being such that not more than approximately 50 percent of the bound amine is released in one hour by elution with .07 N HCl and .03 N NaCl and at least approximately 10 percent is released in three hours, the amount of bound drug in the dosage unit being between .2 to 2000 milligrams calculated as drug base and being in sufficient amount as to be safely effective for a period of at least eight hours and the said drug in base form having an oral LD–50 in rats of between approximately 10 to 3000 milligrams per kilogram.

23. The preparation of the above claim 22 in which the bound drug is present in at least 2 percent by weight of the adsorption compound.

24. In the method of orally administering a drug to a human being wherein the drug is an organic compound containing a basic nitrogen group, the improvement which comprises orally administering said drug ionically bound to a cation exchange resin, said resin being selected from the group consisting of phosphonic, phosphonous, and phosphoric cation exchange resins.

25. In a method of orally administering a drug to a human being, wherein the drug is an organic compound containing a basic nitrogen group and in its base or water soluble salt form if of the type which is absorbable in the gastro-intestinal tract and has an oral LD–50 in rats of 10 to 3000 milligrams per kilogram, the improvement which comprises orally administering the drug in a unit dose containing a therapeutically effective amount of a cation exchange resin selected from the group consisting of phosphonic, phosphonous, and phosphoric cation exchange resins having a polystyrene nucleus cross linked with divinyl benzene, and having the said drug ionically bound to the resin to form an adsorption compound, the cross linkage of the resin of the adsorption compound being between approximately 1 to 20 percent and the particle size of the compound being approximately 10 mesh and 400 mesh, and the cross linkage and particle size being such that not more than approximately 50 percent of the bound amine is released in one hour by elution with .07 N HCl and .03 N NaCl and at least approximately 10 percent is released in three hours, the total amount of bound drug calculated as the drug base in the dosage unit being between approximately .2 to 2000 milligrams.

26. The method of claim 25 wherein the dosage amount of the bound drug is at least twice the average unit dose for the said drug in its base and common salt form.

27. In a method of orally administering an amine drug to a human being, wherein the amine drug in its soluble salt form is adsorbable in the gastro-intestinal tract and is of the type normally administered in unit amounts at least twice during a 12 hour period to obtain a suitable therapeutic effect without undesirable side effects, the improvement wherein the drug can be administered in sufficient amount to be effective for at least eight hours without side effects which comprises orally administering the amine drug in a unit dose in the form of particles of a cation exchange resin selected from the group consisting of phosphonic, phosphonous, and phosphoric cation exchange resins having the said amine drug ionically bound to the resin to form an adsorption compound, the cross linkage of the resin of the adsorption compound being between approximately 1 to 20 percent and the particle size of the adsorption compound being between approximately 10 mesh and 400 mesh, and the cross linkage and particle size being such that not more than approximately 50 percent of the bound amine is released in one hour by elution with .07 N HCl and .03 N NaCl and at least approximately 10 percent is released in three hours, the total amount of bound amine calculated as amine base in the dosage unit being between approximately .2 to 2000 milligrams and in an amount which is safely effective for at least eight hours.

28. The method of treating a patient with an adrenergic amine to provide immediate action and sustained effectiveness for a period of at least eight hours which comprises orally administering to the patient only once during an eight-hour period a composition in unit dosage form consisting essentially of particles of a cation exchange resin selected from the group consisting of phosphonic, phosphonous, and phosphoric cation exchange resins having an adrenergic amine ionically bound to the resin to form an adsorption compound, said adsorption compound having a cross linkage of the resin of approximately 5 percent to 17 percent, the size of the particles of adsorption compound which have a cross linkage of 5 percent to 9 percent being substantially in the range of 10 to 50 mesh, the total amount of bound drug calculated as amine base being between approximately 3 to 200 milligrams, and in an amount such as to be safe and effective over a period of at least eight hours, the proportion of the combined amine in the adsorption compound calculated as amine base being at least 2 percent by weight of the adsorption compound.

29. The method of claim 28 where the amine is amphetamine and the dosage amount is from 2 to 60 milligrams of bound amphetamine.

References Cited in the file of this patent

UNITED STATES PATENTS 2,990,332     Keating _____ June 27, 1961

OTHER REFERENCES

Calmon: Ion Exchangers in Organic and Biochem., Interscience Pub., N.Y., 1957, page 22.

JACS, vol. 74, 1952, pages 1867–8.

UNITED STATES PATENT OFFICE
CERTIFICATE OF CORRECTION

Patent No. 3,143,465 August 4, 1964

John Wm. Keating

It is hereby certified that error appears in the above numbered patent requiring correction and that the said Letters Patent should read as corrected below.

Column 22, line 24, for "if" read -- is --.

Signed and sealed this 24th day of November 1964.

(SEAL)
Attest:

ERNEST W. SWIDER
Attesting Officer

EDWARD J. BRENNER
Commissioner of Patents